(12) United States Patent
Quinlan et al.

(10) Patent No.: US 8,069,144 B2
(45) Date of Patent: Nov. 29, 2011

(54) SYSTEM AND METHODS FOR ASYNCHRONOUS SYNCHRONIZATION

(75) Inventors: Sean Quinlan, San Francisco, CA (US); Daniel J. Mendez, Menlo Park, CA (US); Rajiv Joshi, San Jose, CA (US); Yuri Ardulov, Santa Clara, CA (US)

(73) Assignee: Visto Corporation, Redwood Shores, CA (US)

( * ) Notice: Subject to any disclaimer, the term of this patent is extended or adjusted under 35 U.S.C. 154(b) by 0 days.

(21) Appl. No.: 12/796,969

(22) Filed: Jun. 9, 2010

(65) Prior Publication Data

US 2010/0268844 A1 Oct. 21, 2010

Related U.S. Application Data

(63) Continuation of application No. 10/295,702, filed on Nov. 15, 2002, now Pat. No. 7,752,166.

(60) Provisional application No. 60/336,326, filed on Nov. 15, 2001.

(51) Int. Cl.
*G06F 7/00* (2006.01)
*G06F 17/00* (2006.01)

(52) U.S. Cl. ..................... 707/613; 709/224
(58) Field of Classification Search .................. 707/613; 709/224
See application file for complete search history.

(56) References Cited

U.S. PATENT DOCUMENTS

| | | |
|---|---|---|
| 4,714,995 A | 12/1987 | Materna et al. |
| 4,831,582 A | 5/1989 | Miller et al. |
| 4,875,159 A | 10/1989 | Cary et al. |
| 4,897,781 A | 1/1990 | Chang et al. |
| 5,263,157 A | 11/1993 | Janis |
| 5,386,564 A | 1/1995 | Shearer et al. |
| 5,388,255 A | 2/1995 | Pytlik et al. |
| 5,392,390 A | 2/1995 | Crozier |
| 5,544,320 A | 8/1996 | Konrad |
| 5,572,643 A | 11/1996 | Judson |
| 5,581,749 A | 12/1996 | Hossain et al. |
| 5,588,132 A | 12/1996 | Cardoza |
| 5,600,834 A | 2/1997 | Howard |
| 5,613,012 A | 3/1997 | Hoffman et al. |
| 5,623,601 A | 4/1997 | Vu |
| 5,627,658 A | 5/1997 | Connors et al. |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |

(Continued)

FOREIGN PATENT DOCUMENTS

CA 2210763 1/1999

(Continued)

OTHER PUBLICATIONS

Office Action mailed Oct. 27, 2010, in co-pending U.S. Appl. No. 12/645,799.

(Continued)

*Primary Examiner* — Sathyanarayan Pannala
(74) *Attorney, Agent, or Firm* — Oblon, Spivak, McClelland, Maier & Neustadt, L.L.P.

(57) ABSTRACT

Aspects of the invention provide for information to be synchronized in an asynchronous manner among two or more computing devices.

12 Claims, 10 Drawing Sheets

(System)

U.S. PATENT DOCUMENTS

| | | | |
|---|---|---|---|
| 5,666,553 | A | 9/1997 | Crozier |
| 5,678,039 | A | 10/1997 | Hinks et al. |
| 5,680,542 | A | 10/1997 | Mulchandani et al. |
| 5,682,524 | A | 10/1997 | Freund et al. |
| 5,684,984 | A | 11/1997 | Jones et al. |
| 5,684,990 | A | 11/1997 | Boothby |
| 5,687,322 | A | 11/1997 | Deaton et al. |
| 5,701,400 | A | 12/1997 | Amado |
| 5,701,423 | A | 12/1997 | Crozier |
| 5,706,502 | A | 1/1998 | Foley et al. |
| 5,710,918 | A | 1/1998 | Lagarde et al. |
| 5,713,019 | A | 1/1998 | Keaten |
| 5,715,403 | A | 2/1998 | Stefik |
| 5,717,925 | A | 2/1998 | Harper et al. |
| 5,721,908 | A | 2/1998 | Lagarde et al. |
| 5,721,914 | A | 2/1998 | DeVries |
| 5,729,735 | A | 3/1998 | Meyering |
| 5,745,360 | A | 4/1998 | Leone et al. |
| 5,752,246 | A | 5/1998 | Rogers et al. |
| 5,757,916 | A | 5/1998 | MacDoran et al. |
| 5,758,150 | A | 5/1998 | Bell et al. |
| 5,758,354 | A | 5/1998 | Huang et al. |
| 5,758,355 | A | 5/1998 | Buchanan |
| 5,764,902 | A | 6/1998 | Rothrock |
| 5,765,171 | A | 6/1998 | Gehani et al. |
| 5,778,346 | A | 7/1998 | Frid-Nielsen et al. |
| 5,790,425 | A | 8/1998 | Wagle |
| 5,790,790 | A | 8/1998 | Smith et al. |
| 5,799,318 | A | 8/1998 | Cardinal et al. |
| 5,812,773 | A | 9/1998 | Norin |
| 5,832,483 | A | 11/1998 | Barker |
| 5,835,601 | A | 11/1998 | Shimbo et al. |
| 5,862,325 | A | 1/1999 | Reed et al. |
| 5,862,346 | A | 1/1999 | Kley et al. |
| 5,870,759 | A | 2/1999 | Bauer et al. |
| 5,878,230 | A | 3/1999 | Weber et al. |
| 5,924,103 | A | 7/1999 | Ahmed et al. |
| 5,928,329 | A | 7/1999 | Clark et al. |
| 5,943,676 | A | 8/1999 | Boothby |
| 5,951,652 | A | 9/1999 | Ingrassia, Jr. et al. |
| 5,961,590 | A | 10/1999 | Mendez et al. |
| 5,966,714 | A | 10/1999 | Huang et al. |
| 5,968,131 | A | 10/1999 | Mendez et al. |
| 5,974,238 | A | 10/1999 | Chase, Jr. |
| 5,999,932 | A | 12/1999 | Paul |
| 5,999,947 | A | 12/1999 | Zollinger et al. |
| 6,020,885 | A | 2/2000 | Honda |
| 6,021,427 | A | 2/2000 | Spagna et al. |
| 6,023,700 | A | 2/2000 | Owens et al. |
| 6,023,708 | A | 2/2000 | Mendez et al. |
| 6,034,621 | A | 3/2000 | Kaufman |
| 6,073,165 | A | 6/2000 | Narasimhan et al. |
| 6,085,192 | A | 7/2000 | Mendez et al. |
| 6,108,709 | A | 8/2000 | Shinomura et al. |
| 6,118,856 | A | 9/2000 | Paarsmarkt et al. |
| 6,131,096 | A | 10/2000 | Ng et al. |
| 6,131,116 | A | 10/2000 | Riggins et al. |
| 6,138,146 | A | 10/2000 | Moon et al. |
| 6,151,606 | A | 11/2000 | Mendez et al. |
| 6,212,529 | B1 | 4/2001 | Boothby et al. |
| 6,249,805 | B1 | 6/2001 | Fleming, III |
| 6,295,541 | B1 | 9/2001 | Bodnar et al. |
| 6,321,236 | B1 | 11/2001 | Zollinger et al. |
| 6,343,313 | B1 | 1/2002 | Salesky et al. |
| 6,477,545 | B1 | 11/2002 | LaRue |
| 6,510,455 | B1 | 1/2003 | Chen et al. |
| 6,564,218 | B1 | 5/2003 | Roth |
| 6,779,019 | B1 * | 8/2004 | Mousseau et al. ............ 709/206 |
| 6,901,380 | B1 * | 5/2005 | Bremers ........................ 705/27 |
| 7,539,665 | B2 | 5/2009 | Mendez |
| 2002/0060246 | A1 | 5/2002 | Gobburu et al. |
| 2002/0087476 | A1 * | 7/2002 | Salas et al. ..................... 705/59 |
| 2004/0117310 | A1 | 6/2004 | Mendez et al. |
| 2004/0215709 | A1 | 10/2004 | Basani et al. |
| 2005/0198087 | A1 | 9/2005 | Bremers |
| 2006/0195595 | A1 | 8/2006 | Mendez et al. |
| 2007/0174433 | A1 | 7/2007 | Mendez et al. |
| 2010/0100641 | A1 | 4/2010 | Quinlan et al. |

FOREIGN PATENT DOCUMENTS

| | | |
|---|---|---|
| EP | 0801478 | 10/1997 |
| JP | 2000-20370 | 1/2000 |
| WO | WO 97/04389 | 2/1997 |
| WO | WO 97/35265 | 9/1997 |
| WO | WO 99/05620 | 2/1999 |
| WO | WO 99/36870 | 7/1999 |
| WO | WO 99/45451 | 9/1999 |
| WO | WO 00/11567 | 3/2000 |
| WO | WO 00/20994 | 4/2000 |
| WO | WO 01/06364 | 1/2001 |
| WO | WO 01/78319 | 10/2001 |

OTHER PUBLICATIONS

Bellovin, Steven M. et al., "Network Firewalls," IEEE Communications Magazine, Sep. 1994, pp. 50-57.

Braun, Hans-Werner, et al., "Web Traffic Characterization: An Assessment of the Impact of Caching Documents from NCSA's Web Server," Computer Networks and ISDN Systems, 1995, pp. 37-51, vol. 28.

Brown, Margaret J., "The Visto Briefcase Pro Puts Your PIM on the Internet," Aug. 13, 1998, 1 page. URL:http://www.zdnet.com/zdnn/stories/zdnn_display/0,3440,341892,00.html.

Cobb, S., Director of Special Projects National Computer Security Association, "Establishing Firewall Policy," Jun. 25-27, 1996, pp. 198-205, ISBN# 0-7803-3268-7.

Greenwald, Michael, et al., "Designing an Academic Firewall: Policy, Practice, and Experience With SURF," Proceedings of SNDSS 1996, 1996 IEEE, Feb. 22, 1996, pp. 79-92.

Kiuchi, Takahiro, et al., C-HTTP—The Development of a Secure, Closed HTTP-based Network on the Internet, Proceedings of SNDSS 1996, 1996 IEEE, Feb. 22, 1996, pp. 64-75.

Marinacci, Enzo, "Bookmark Translator 2.0—This Utility Transform Microsoft Internet Explorer's Bookmarks in the Format Valid for Netscape Navigator and vice versa," Jul. 1997, 4 pages, Published in Rome, Italy. URL:http://www.bns.it/EMware/BookmarkTranslator-uk.html.

Nelson, Ruth, et al., "Security for Infinite Networks," 1995 IEEE, Aug. 22, 1995, pp. 11-19.

Research Disclosure; "Provide Auto-Forwarding Based on Criteria Selected by the User"; Oct. 1, 1989; 1 page; No. 306; Kenneth Mason Publications; XP000085405; ISSN 0374-4353.

Stempel, Steffen, "IpAccess—An Internet Service Access System for Firewall Installations," 1995 IEEE, Feb. 16, 1995, pp. 31-41.

Office Action mailed Jul. 1, 2011, in co-pending U.S. Appl. No. 12/645,799.

"Optimistic Replication" https://secure.wikimedia.org/wikipedia/en/wiki/Optimistic_replication, published Jul. 25, 2007.

"Version Vector" https://secure.wikimedia.org/en/wiki/Version_vector, published Sep. 16, 2009.

"Vector Clock" https://secure.wikimedia.org/wikipedia/en/wiki/Vector_clock, published Jan. 9, 2005.

David Ratner et al., "Dynamic Version Vector Maintenance", Tech Report CSD-970022, Department of Computer Science, University of California, Los Angeles, 1997, pp. 1-7.

D. Stott Parker, Jr., et al., "Detection of mutual inconsistency in distributed systems," IEEE Transactions of Software Engineering, vol. SE-9, No. 3, May 1983, pp. 240-247.

Leslie Lamport, "Time, clocks, and the ordering of events in a distributed system," Communications of the ACM, vol. 21, No. 7, Jul. 1978, pp. 558-565.

"Chapter 14-1: Anatomy of a Note ID" http://www-12.lotus.com/ldd/doc/tools/c/6.5/api65ug.nsf/85255d56004d2bfd85255b1800631684/00d000c1005800c985255e0e00726863?OpenDocument, published Sep. 1, 2002.

Rivka Ladin, et al., "Providing high availability using lazy replication", ACM Transactions on Computer Systems, vol. 10, No. 4, Nov. 1992, pp. 360-391.

Yasushi Saito, et al., "Optimistic Replication," ACM Computing Surveys, vol. 37, No. 1, Mar. 2005, pp. 42-81.

Rlvka Ladin, et al., "Lazy replication: exploiting the semantics of distributed services," ACM, 1990, pp. 43-57.

Jim Gray, et al., "The dangers of replication and a solution", ACM SIGMOD conference at Montreal, 1996, pp. 173-182.

US 5,373,559, 12/1994, Kaufman et al. (withdrawn)

* cited by examiner (System)

(Common Store Manager)

(Assistant)

(Data Center)

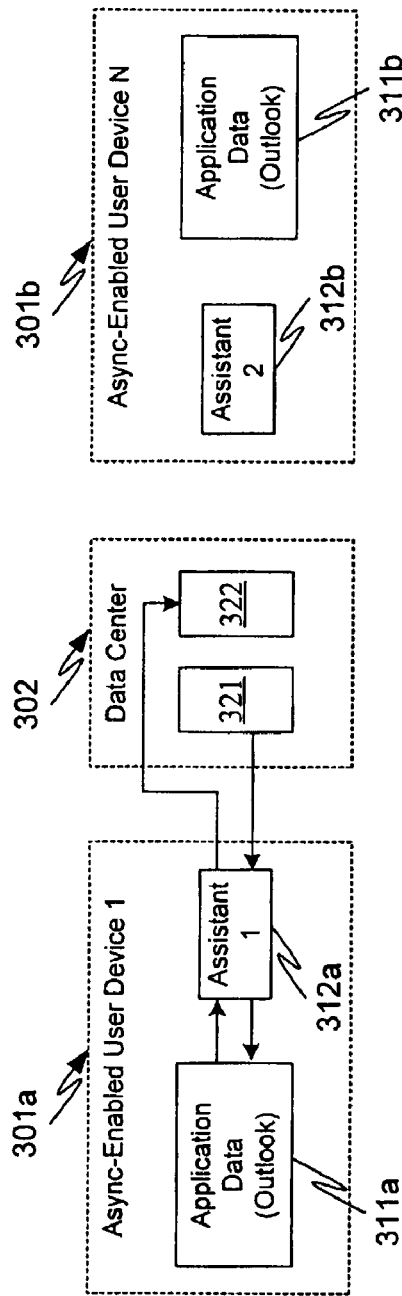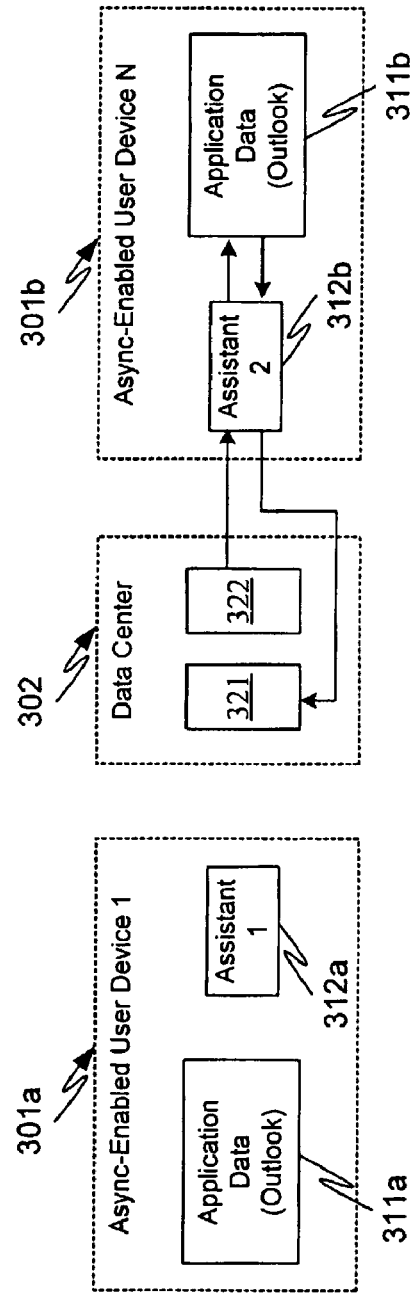
FIG. 3c
FIG. 3d
(Asynchronous Operation)

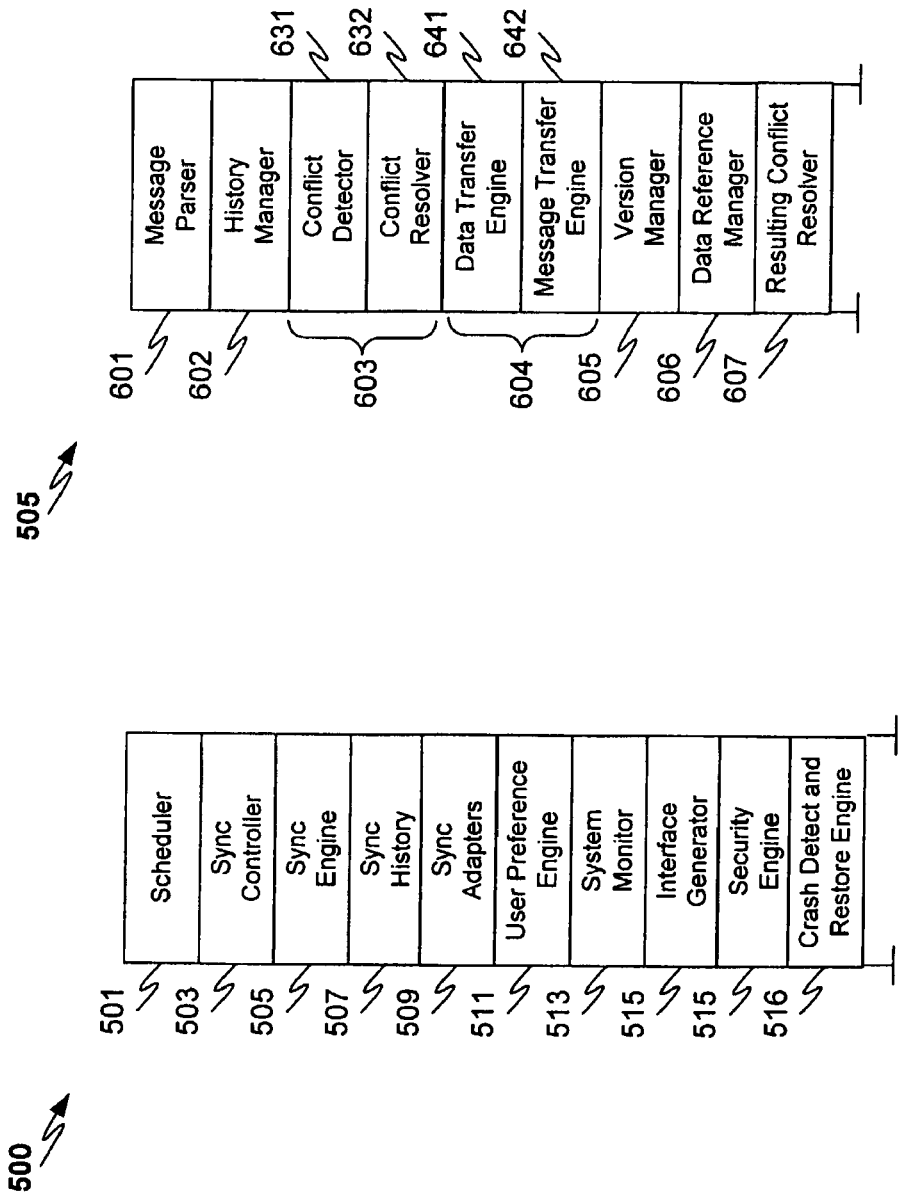

FIG. 7
(Sync Message)

| Message ID | Instruction | Wrkspc Element | Device-1 Version | Device-2 Version | Source | Target | WE Ref. |
|---|---|---|---|---|---|---|---|
| 701 | 702 | 703 | 704 | 705 | 706 | 707 | 708 |

700

FIG. 8
(Sync History)

| Workspace | | Device-1 | Device-N | Hash | Read Only |
|---|---|---|---|---|---|
| Workspace Element-A | Device-1 Version | Device-1 Version | Device-2 Version | Hash Value | Read Only Flag |
| Workspace Element-B | Device-1 Version | Device-1 Version | Device-2 Version | Hash Value | Read Only Flag |
| ••• | ••• | ••• | ••• | ••• | ••• |
| 811 | 812 | | 813 | 814 | 815 |

800, 801, 802, 800a (Client User Device Map)

(Server User Device Map)

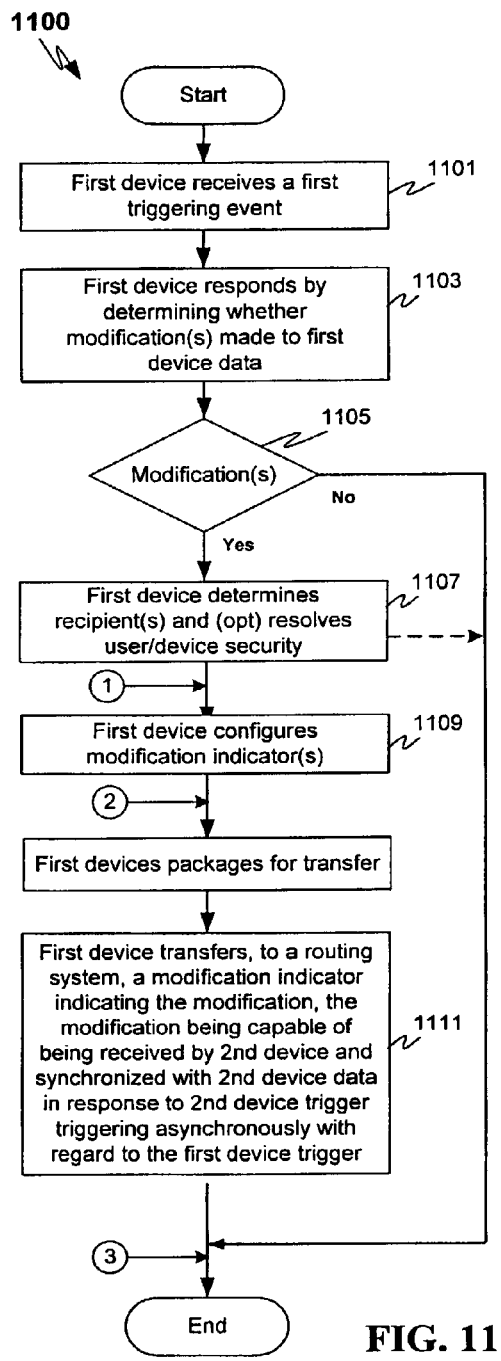
FIG. 11
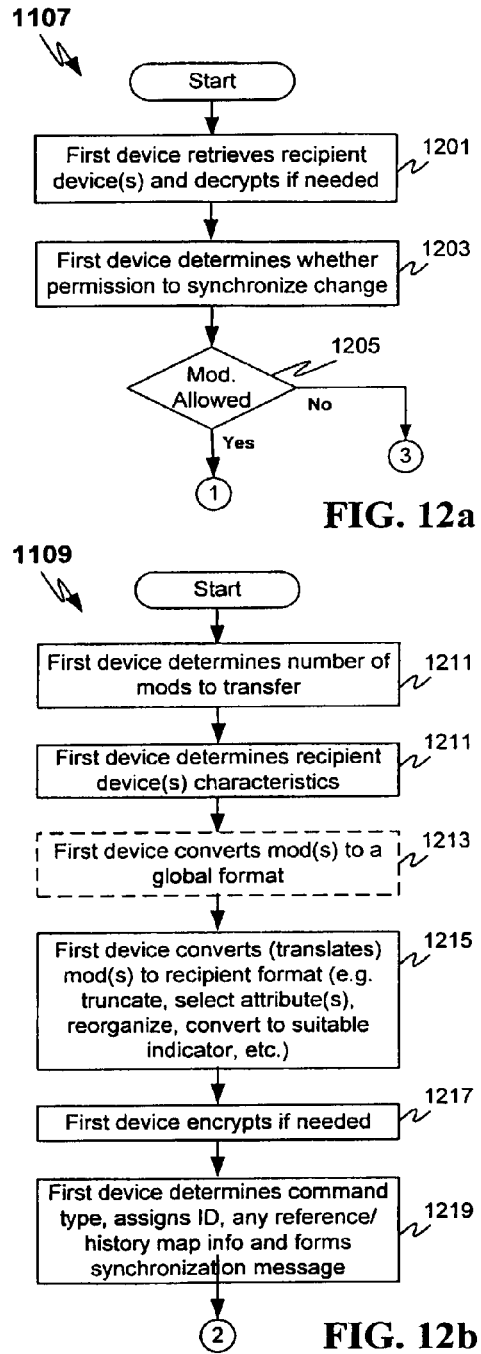
FIG. 12a
FIG. 12b

SYSTEM AND METHODS FOR ASYNCHRONOUS SYNCHRONIZATION

PRIORITY REFERENCE TO RELATED APPLICATIONS

This application is a continuation application of U.S. application Ser. No. 10/295,702 filed on Nov. 15, 2002, which claims the benefit of provisional application Ser. No. 60/336,326, filed on Nov. 15, 2001, the entire contents of both of which are incorporated herein by reference.

BACKGROUND OF THE INVENTION

1. Field of the Invention

This invention relates generally to computer systems, and more particularly provides a system and methods that provide for synchronizing information among two or more devices.

2. Background

The development of more capable and less expensive computing technologies is not only increasing the number of personal computer or "PC" users. It is also providing a broader variety and number of computing devices, and increasing the number of users utilizing more than one computing device (e.g. a PC, cell phone and PDA). It is observed, however, that techniques used with conventional computing devices and information may well become problematic with regard to emerging devices, device interconnection and information handling, as well as the number of users utilizing such emerging technologies.

Conventional synchronous data synchronization, for example, provides for completely synchronizing specified user data on two of the user's computing devices upon each application of a synchronization algorithm.

Prior to synchronization, specified user data residing on a first user device ("first device data") is transferred to and stored at the network server ("server data"). Synchronization is then typically initiated upon a later startup or shutdown of the first user device, or periodically, according to user preferences.

During synchronization, the server completely synchronizes the server data with the first device data and with corresponding data residing on the second user device ("second device data"). That is, assuming no conflict exists, a copy of all identified modifications to the first device data is transferred to the server, and the server correspondingly replaces or adds to the server data; a copy of the modifications now made to the server data is then similarly made to the second device data, replacing or adding to the second device data as needed. If a conflict exists, i.e., a data element has been modified at both user devices, then the network server typically resolves the conflict by preferring one user device over the other, or by allowing the user to select one of the data versions. If the first device modification is selected, the server replaces the corresponding second device data. The server then similarly synchronizes any non-conflicting modifications to the second device data with the server data and then the first device data.

Despite its proliferation, however, conventional synchronization is also subject to certain disadvantages. For example, conducting each synchronization with regard to all of the specified data on even two of a user's devices can require substantial user device resources. This can become particularly problematic with less capable user devices, such as smart phones or PDAs, since a user may be denied use of his device throughout the synchronization process.

Synchronous synchronization can also require substantial network resources. For example, the network bandwidth required for synchronizing potentially large amounts of data for a increasing number of users may become unmanageable. Similarly, while apparently sufficient, a significant increase in the number of users seeking synchronization services may strain network server capabilities. In any event, those resources that might otherwise be available for other uses must instead be devoted to conducting synchronization.

Still further disadvantages include those relating to the availability of up-to-date information and security. For example, extended time requirements might prompt a user to conduct synchronization other than at startup (e.g., before using a cell phone) or on a less frequent periodic basis. A user might therefore end up using out-of-date data that is available and appears valid prior to synchronization. The maintaining of security might also become problematic, since authentication and any encryption of the entire dataset are typically conducted by the "more capable" network server of the synchronization service provider.

Accordingly, there is a need for a synchronization system and methods that enable computing device information to be synchronized while avoiding the disadvantages of existing synchronization.

SUMMARY OF THE INVENTION

Aspects of the invention provide for conducting synchronization asynchronously among two or more computing devices, while further enabling disadvantages of prior synchronization to be avoided.

In one aspect, embodiments enable synchronization to be conducted asynchronously, such that a first computing device can initiate synchronization of specified first device data with data of a second device at times that are independent of the second device receiving the first device data or initiating synchronization of second device data with the first device. In another aspect, embodiments also enable such synchronization to be conducted among more than two devices, devices of more than one user, or both. In a further aspect, embodiments enable transfer of data modifications, updating and conflict resolution to be conducted by the synchronizing user devices, and enable prior server storing of all information designated to be synchronized or server conducting of synchronization to be avoided. In yet another aspect, embodiments enable synchronization to be initiated on variable amounts or granularities of data, among still further aspects.

An asynchronous synchronization method example according to the invention includes a first computing device receiving a first trigger and responding by determining whether a modification has been made to first device data and, if so, transferring to a routing system a modification indicator indicating the modification. In this example, the modification is further capable of being received by a second computing device and synchronized with second device data of the second computing device in response to a second device trigger triggering asynchronously as compared with the first device trigger. For example, first trigger might be invoked as a result of each first device data modification in which a device user was not using the device or upon a third party issuing a specific update or an update to a specified dataset; the second trigger might be invoked as a result of a user requesting an update, connecting the second device to the routing system for some other purpose while a modification is pending receipt, and so on, among other examples.

A further method example according to the invention includes a first computing device receiving a first triggering event and responding to the event by connecting to a routing system, if disconnected from the routing system, and further, receiving from the routing system a modification indicator indicating a modification to second device data of a second computing device. In this example, the modification indicator can be transferred to the routing system in response to a second device trigger that triggers asynchronously or "time-independently" with respect to the first device trigger.

A still further method example according to the invention includes a routing system receiving, from a first computing device operating in response to a first device trigger, a modification indicator indicating a modification to first device data, and storing the modification indicator. The method further includes receiving a request for first device modifications from a second computing device operating in response to a second device trigger that triggers asynchronously with respect to the first device trigger. The method still further includes responding by transferring to the second computing device the modification indicator, and the modification being capable of being received by the second computing device and synchronized with second device data.

In accordance with the above or various other system or method examples, the modification indicator might, for example, include one modification to one data element, many modifications to different data, modifications to one or more data attributes, an indicator of a type/extent of a change, and so on. The modification might have been converted to a form useable by the first/second device(s) or be convertible by them, or the amount of data sent or received might be different depending upon available device/network resources, user use of the device, and so on. The data might include program code or multimedia data, and so on, among other examples.

Advantageously, aspects of the invention enable synchronization of information among two or more computing devices to be conducted in a highly effective and efficient manner. The ability of different computing devices to send and receive data modifications asynchronously according to time/event criteria suitable to different devices, device resources or device operations is enabled. The ability of computing devices to resolve data conflicts or resulting conflicts is further enabled. The ability of different computing devices to send or receive different amounts, types or granularities of data in accordance with available or lesser desirable resources of the devices or network elements is still further enabled, among still further examples. Other advantages will also become apparent by reference to the following text and figures.

BRIEF DESCRIPTION OF THE DRAWINGS

FIG. 3c is a flow diagram illustrating the operation of a first asynchronous synchronization assistant, according to an embodiment of the invention;

FIG. 3d is a flow diagram illustrating the operation of a second asynchronous synchronization assistant, according to an embodiment of the invention;

FIG. 5 illustrates, in greater detail, an asynchronous synchronization assistant, according to an embodiment of the invention;

FIG. 6 illustrates a synchronization engine according to an embodiment of the invention;

FIG. 7 illustrates a synchronization message example according to an embodiment of the invention;

FIG. 8 illustrates a synchronization history example according to an embodiment of the invention;

FIG. 11 is a flowchart illustrating a method for initiating asynchronous synchronization according to an embodiment of the invention;

FIG. 12a illustrates a method for determining modification recipients and conducting security in conjunction therewith, according to an embodiment of the invention;

FIG. 12b is a flowchart illustrating a method for configuring one or more modification indicators by an asynchronous synchronization initiating computing system according to an embodiment of the invention;

DETAILED DESCRIPTION

In providing for asynchronous synchronization systems and methods, aspects of the invention enable information to be synchronized asynchronously among two or more computing devices. Aspects enable prior network server conducting of synchronization and copying of target data to be avoided. Aspects also enable synchronization to be conducted on a variety of information types and granularities, among still further aspects.

(Note that the term "or", as used herein, is intended to generally mean "and/or", unless otherwise indicated. "User device" and "computing device" will further be used interchangeably, as will "information to be synchronized" and "user device data", so that the invention might be better understood. Such terms should not, however, be construed as limiting.)

Figure 1:
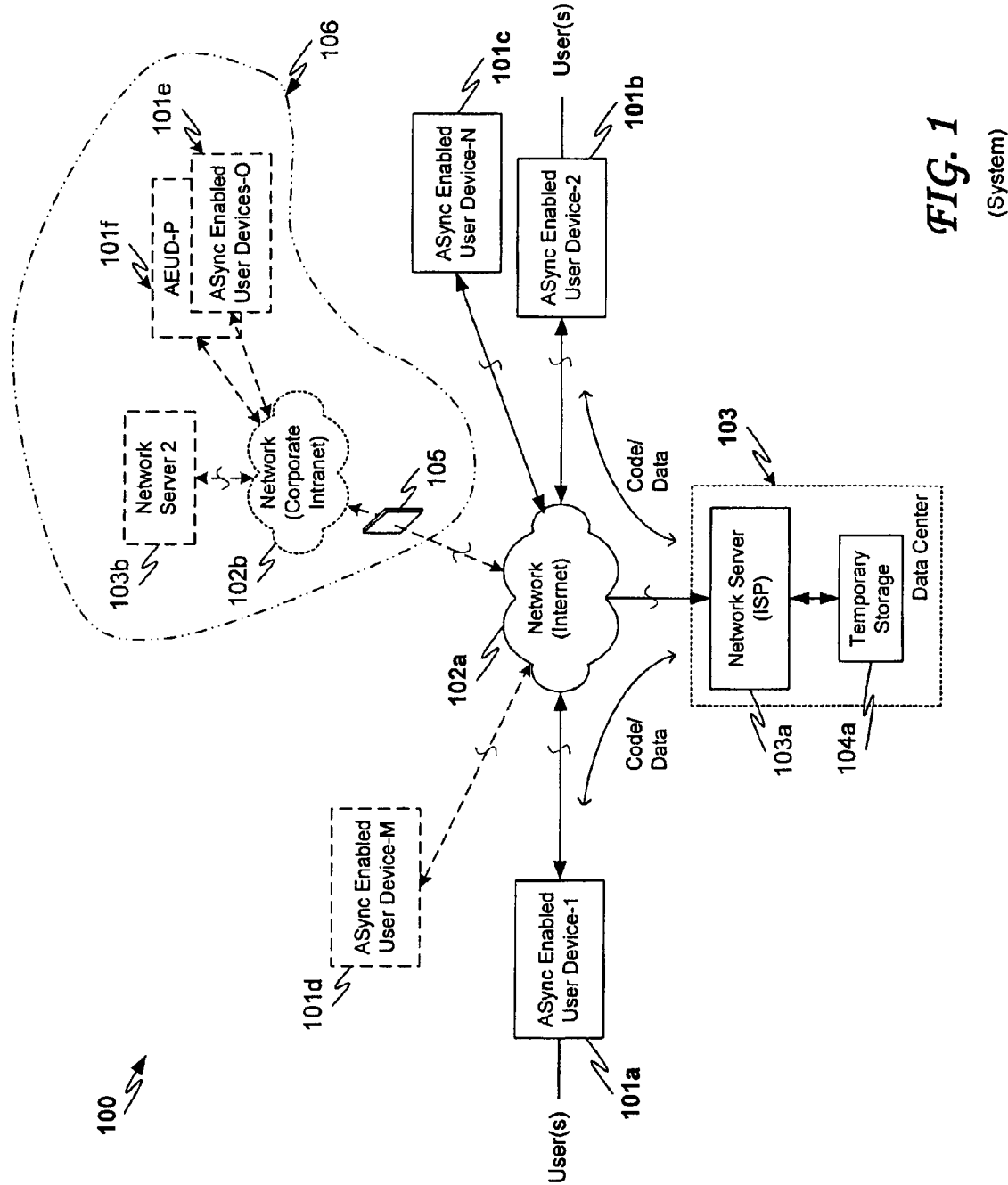
FIG. 1 is a flow diagram illustrating an asynchronous synchronization system according to an embodiment of the invention.

FIG. 1 illustrates an example of a generalized network system 100 that has been configured to enable asynchronous synchronization among various computing devices including, for example, corporate devices coupled via a corporate intranet, personal devices coupled via the Internet, or some combination. As shown, system 100 includes ASync-enabled user devices 101a-b and 101c-f, network (e.g., 102a-b), network server (e.g., 103a-b) and common storage 104. ASync system 100 can also include one or more firewalls (e.g., firewall 105), as well as routers, caches, backup systems or other interconnected network elements, according to the requirements a particular application (not shown).

Broadly stated, asynchronous synchronization enables a first user device to initiate synchronizing of at least one information modification, or to respond to initiated synchronizing of information of another user device, and preferably both, in an asynchronous manner. More preferably, the first user device can initiate repeated synchronizing of modifications to first user device information independently of whether a second user device is connected to the first or has completed a prior initiated synchronizing by the first device or the first device has completed prior initiated synchronization by the other device.

Embodiments also enable asynchronous synchronization to be conducted among one or more overlapping or non-overlapping groups of ASync-enabled user devices in which any grouping includes two or more such devices synchronizing corresponding workspace elements. Each user device in a synchronizing group of user devices might, for example, initiate or respond to synchronizing according to its own time/event trigger, user initiation, or some other suitable synchronization trigger. Asynchronous synchronization can also be enabled or disabled according to time, schedule, event, resource availability or other criteria for one or more selected user devices or user device groups.

In the present example, synchronization is conducted via a routing system, here a data center having a temporary storage for temporarily storing synchronization messages communicated to and from the synchronizing devices.

ASync-enabled user devices 101a-f can include any computing devices that are capable of storing user information, designating user information to be synchronized or "workspace elements" and conducting asynchronous synchronization of a portion of the workspace elements that has been modified (e.g., added or altered). Each of ASync-enabled user devices 101a-f can thus comprise any unitary or multiple function computing device that is further capable of conducting synchronization in an asynchronous manner not inconsistent with the discussion herein (i.e., that is "ASync-enabled").

More typically, ASync-enabled user devices 101a-f might include conventional user devices to which asynchronous synchronization functionality has been added. Such user devices can, for example, include but are not limited to desktop or laptop PCs, handheld computers, settop boxes, personal data assistants ("PDAs"), personal information managers ("PIMs"), cell phones, controllers or so-called "smart" devices, among other computing systems. ASync-enabled user devices 101a-f can further include single or multi-user, or integrated or distributed computing devices. A synchronizing user device group might, for example, include at least two of one or more users' devices, such as a single user's network couplable PC, PDA and cell phone (which is sometimes referred to as a "smart" phone).

Information to be synchronized (i.e., "user device information" or "workspace elements") includes information designated, typically by a user device user or another person acting as a system administrator, as requiring synchronization with at least one other user device. Workspace elements can generally include substantially any type of program code or multimedia data (e.g., values, other attributes, value/attribute indicators, change indicators, and so on) that can be stored, referenced and transferred, at least in part, by each ASync-enabled user device synchronizing such information.

More typically, workspace elements might, for example, include one or more of email, bookmarks, contact, meeting notes or project data, or attributes or portions thereof, or other user device information that is entered by a user into a resident or downloadable application program. (It will be appreciated that workspace elements can also be automatically (e.g., programmatically) generated or electronically received by suitably configured ASync-enabled user device.)

It should be noted that not all user devices must be able to handle complete workspace elements or to maintain all workspace elements in the same manner. Asynchronous synchronization instead enables different user devices to run different application programs or versions thereof, and can synchronize less than complete workspace element attributes, according to the capabilities of the particular user devices. (See below.)

ASync-enabled user devices 101a-f are further couplable for synchronizing user device information via one or more wired or wirelessly couplable connections, such as networks 102a-b. In the present example, network 102a is a wide area network or "WAN", such as the Internet, while network 102b is a local area network or "LAN", such as a corporate intranet. It will be appreciated, however, that one or more of various static or reconfigurable interconnections can also be used for transferring workspace elements among user devices.

Network server 103a, in this example, operates as a part of a data center 103. Unlike prior synchronization systems, a common synchronization controller for storing all workspace data and conducting synchronization between each of a pair of user devices is not required. Synchronization can instead be conducted asynchronously by ASync-enabled user devices 101a-f.

In the present example, network server 103a instead operates as a common storage manager of temporary storage 104a. Network server 103a more specifically responds to first user device requests by forming a communication link and then receiving and temporarily storing first user device information, or then retrieving and communicating, to the first user device, information asynchronously received and stored from another user device. Network server 103a can further provide for deleting temporarily stored user device information of a first user device following retrieval of the information by one or more other user devices in a same synchronization group. (Temporary storage 104, which stores the user device information, can comprise a memory, cache, more permanent storage device, or any suitable storage medium in accordance with a particular application.)

Finally, network server 103b operates in a conventional manner as a corporate network server. As such, network server 103b operates in a transparent manner with respect to synchronization. It will be appreciated, however, that network server 103b might also operate in an otherwise conventional manner to provide for caching information to be synchronized, or further provide for synchronization within corporate network 106 or distributed synchronization within system 100.

As an operational example of system 100, assume that ASync-enabled user devices 101a-c are a PC, cell phone and PDA respectively of a single user that are configured for conducting asynchronous synchronization (i.e., ASync-enabled). Prior to synchronization, the user configures each of the devices to synchronize all personal contact information (e.g., stored in a personal contact folder of a contact program running on each of the devices) to the remaining devices each time the personal contact information changes. Assume further that the user configures each of the devices to check, upon startup, for all synchronization information from each of the remaining devices, and that no device remains coupled to network server 103a.

When the user modifies a personal contact (e.g., by changing an existing contact phone number) on the ASync-enabled PC, the PC couples via network 102a to network server 103a and transfers a modification message via network server 103a to storage 104. Then, when the user starts up one of the remaining devices (e.g., the PDA), the PDA couples via network 102a to network server 103a, and retrieves the modification message from storage 104. (Any conflict resolution with regard to the modification, which is discussed below, would then be conducted.) The PDA then stores the data corresponding to the modification message.

If the user further modifies personal contact information on the PDA (e.g., adding a new contact), the PDA similarly becomes coupled to network server 103*a* and transfers the modification to storage 104. If the user then starts up one of the remaining devices, e.g., the cell phone, the cell phone couples via network 102*a* to network server 103*a*, and retrieves both of the modifications from storage 104. Then, assuming that no conflict exists, the cell phone stores the data corresponding to the PC and PDA modifications.

Figure 2:
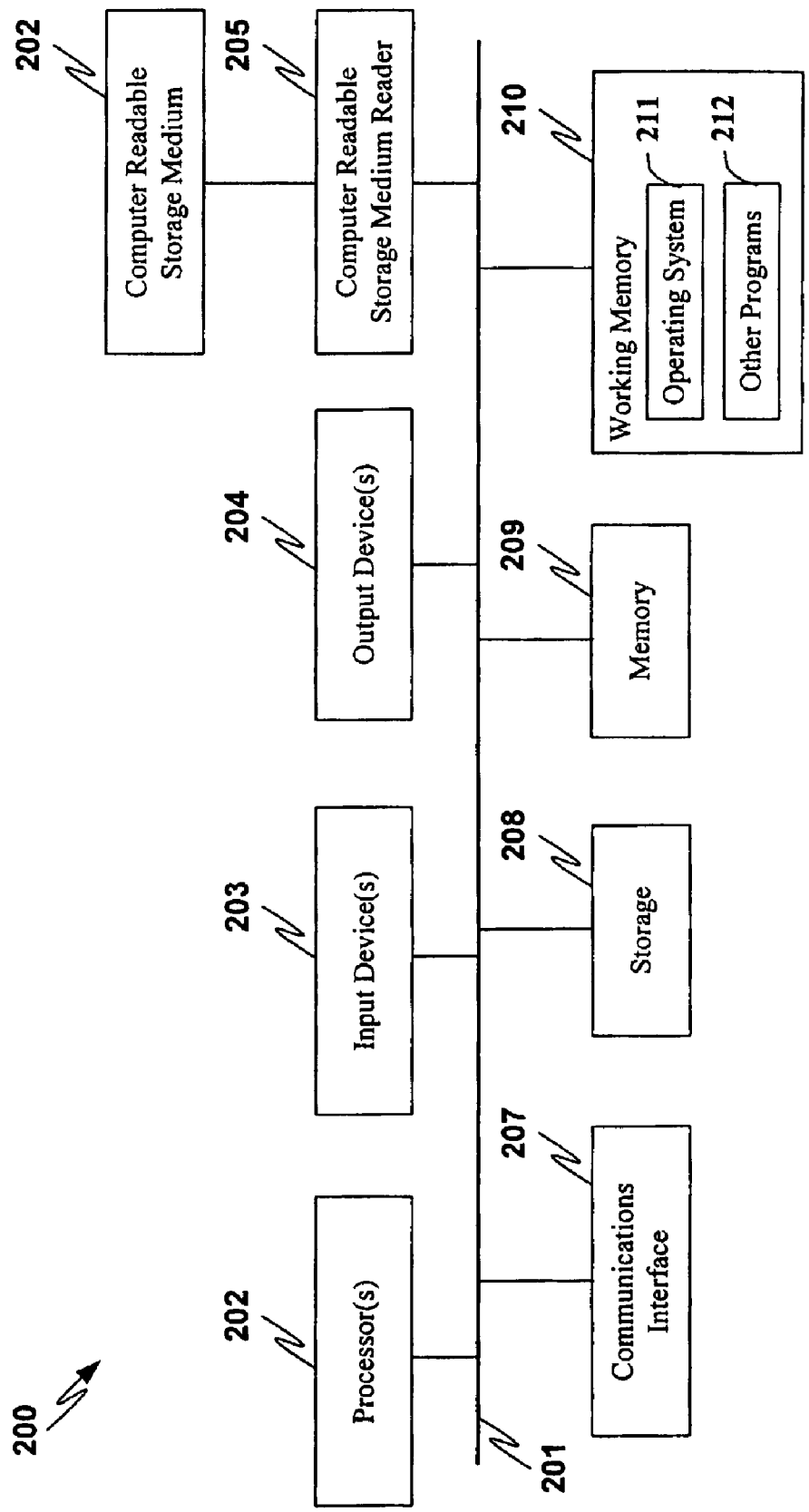
FIG. 2 is a block diagram illustrating a processing system capable of implementing asynchronous synchronization system elements, according to an embodiment of the invention.

FIG. 2 illustrates an exemplary processing system that can comprise one or more of the elements of system 100 (FIG. 1). While other alternatives might be utilized, it will be presumed for clarity sake that elements of system 100 are implemented in hardware, software or some combination by one or more processing systems consistent therewith, unless otherwise indicated.

Processing system 200 comprises elements coupled via communication channels (e.g. bus 201) including one or more general or special purpose processors 202, such as a Pentium®, Power PC®, digital signal processor ("DSP"), and so on. System 200 elements also include one or more input devices 203 (such as a mouse, keyboard, microphone, pen, etc.), and one or more output devices 204, such as a suitable display, speakers, actuators, etc., in accordance with a particular application.

System 200 also includes a computer readable storage media reader 205 coupled to a computer readable storage medium 206, such as a storage/memory device or hard or removable storage/memory media; such devices or media are further indicated separately as storage device 208 and memory 209, which can include hard disk variants, floppy/compact disk variants, digital versatile disk ("DVD") variants, smart cards, read only memory, random access memory, cache memory, etc., in accordance with a particular application. One or more suitable communication devices 207 can also be included, such as a modem, DSL, infrared or other suitable transceiver, etc. for providing inter-device communication directly or via one or more suitable private or public networks that can include but are not limited to those already discussed.

Working memory 210 (e.g. of memory 209) further includes operating system ("OS") 211 elements and other programs 212, such as application programs, mobile code, data, etc. for implementing system 100*a-c*/200 elements that might be stored or loaded therein during use. The particular OS can vary in accordance with a particular device, features or other aspects in accordance with a particular application (e.g. Windows, Mac, Linux, Unix or Palm OS variants, a proprietary OS, etc.). Various programming languages or other tools can also be utilized. It will also be appreciated that working memory 210 contents, broadly given as OS 211 and other programs 212 can vary considerably in accordance with a particular application.

When implemented in software (e.g. as an application program, object, agent, downloadable, servlet, and so on in whole or part), a system 100 element can be communicated transitionally or more persistently from local or remote storage to memory (or cache memory, etc.) for execution, or another suitable mechanism can be utilized, and elements can be implemented in compiled or interpretive form. Input, intermediate or resulting data or functional elements can further reside more transitionally or more persistently in a storage media, cache or other volatile or non-volatile memory, (e.g. storage device 307 or memory 308) in accordance with a particular application.

FIGS. 3*a* through 3*d* illustrate exemplary ASync-enabled user device and data center operation in greater detail.

Figure 3A:
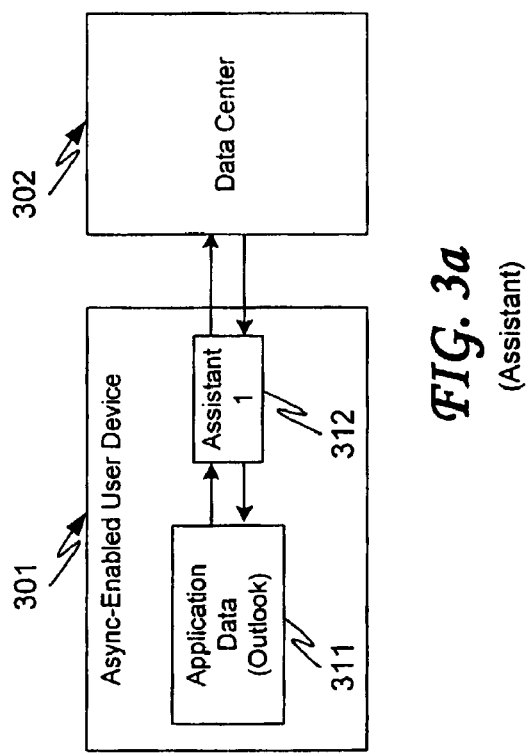
FIG. 3a is a flow diagram illustrating the use of an asynchronous synchronization assistant and a data center, according to an embodiment of the invention.
Figure 3B:
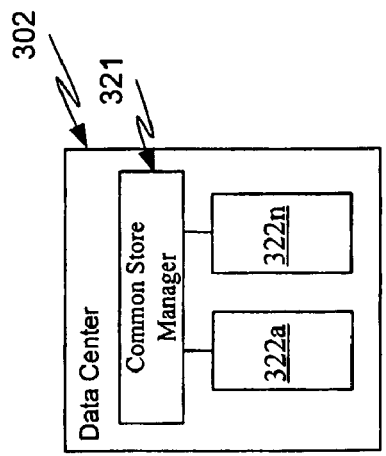
FIG. 3b is a block diagram illustrating the data center of FIG. 3a in greater detail.

Beginning with FIG. 3*a*, ASync-enabled user device 301 includes an asynchronous synchronization manager or "assistant" that enables the user device to conduct asynchronous synchronization. Assistant 312 is preferably implemented as a stand-alone resident or downloadable application. It will be appreciated, however, that assistant 312 can also be integrated to varying extents with an OS or one or more underlying applications.

Assistant 312 provides for initiating and conducting synchronization in accordance with (typically user) overrideable user preferences entered by a user prior to initiating synchronization, and which are predetermined during synchronization. During synchronization, assistant 312 responds to a synchronization trigger by transferring one or more modified workspace elements (here, application data 311) to/from an application data space, or transferring synchronization messages to/from data center 302.

Assistant 312 more specifically responds to an initiation trigger by receiving from an application data space one or more workspace elements that have been modified, forming a synchronization message, interconnecting with data center 302 (if not already interconnected) and transferring the message thus formed to data center 302. Assistant 312 responds to a response trigger by interconnecting with data center 302 (if not already interconnected) and receiving from data center 302 typically one synchronization message. Assistant 312 then determines if a conflict exists with regard to workspace elements of ASync-enabled user device 301. If no conflict exists, then assistant causes any data contained in the synchronization message to be stored in the application data space, thereby adding to or replacing existing data. If a conflict does exist, then assistant 312 initiates conflict resolution. (Conflict resolution is discussed separately below.)

Note that the present example presumes an assistant implementation in which no queuing of messages is conducted by the assistant. Such an implementation is found to benefit from lesser complexity and an approach suitable to devices having very limited storage/processing resources. However, each ASync-enabled user device can also be individually configured, for example, in accordance with available resources. Thus, a more capable user device might be implemented to store, transfer or receive more synchronization messages, while another might conduct one or more operations with fewer synchronization messages according to currently available resources, and still another might always operate on only one message at a time.

Preferably, assistant 312 conducts transfers in an otherwise conventional manner, for example, transferring data via an application protocol interface or "API", and transferring messages using HTML or a message transfer protocol, such as SOAP. However, other transfer mechanisms can also be used in accordance with a particular application.

FIGS. 3*c* through 3*e* and FIG. 4 illustrate how data center 302 can be implemented as a common store manager 321 and temporary storage including data queues 322*a-n*.

Common store manager 321 provides for initializing and managing a temporary storage (message queues in this example) for storing synchronization messages of two or more ASync-enabled user devices. Prior to synchronization of related user devices, common store manager 321 responds to an initialization request from a user device by initializing a number of message queues corresponding to user preferences (e.g., a number of synchronizing devices in a synchronization group).

During synchronization, common store manager 321 responds to user device requests by receiving and storing one or more synchronization messages in a write message queue for retrieval by at least one other user device, or returning from a message queue to a requesting device synchronization messages received from another user device. Common store manager 321 further provides for deleting synchronization messages that have already been received by the one or more corresponding user devices to which they are directed.

Common store manager 321 can also provide for polling of message queues (or otherwise determining whether a synchronization event exists), and transferring to one or more ASync-enabled user devices an alert trigger. Such triggering might be used, for example, to alert an ASync-enabled user device that is interconnected for sending a synchronization message or that has already received synchronization messages that one or more synchronization messages is also available for retrieval. In the present implementation, however, common store manager 321 polls message queues upon receipt of a request from a corresponding ASync-enabled user device.

Figure 4:
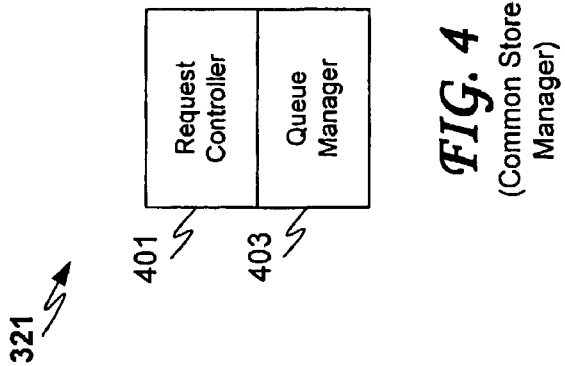
FIG. 4 is a block diagram illustrating a common store manager, according to an embodiment of the invention.

As shown in FIG. 4, common store manager includes a request controller 401 for responding to requests and invoking message queue handling, and a queue manager for conducting message queue initialization and polling, and message retrieval and storage. (Common store manager 321 can, for example, be implemented in an otherwise conventional manner as a storage device management function of a network server, such as server 103a of FIG. 1).

A system of first-in-first-out or "FIFO" message queues is found to be a convenient temporary storage configuration for storing user device messages. For example, using a FIFO for each corresponding ASync-enabled user device (FIGS. 3c and 3d) provides a straight forward common storage configuration for asynchronous transfers of synchronization messages between ASync-enabled user devices 301a and 301b.

In FIG. 3c, for example, assistant-1 312a of ASync-enabled user device 301a responds to a synchronization trigger by storing one or more synchronization messages in message queue-B 322b, which message queue is accessible for receiving messages by assistant-2 312b of ASync-enabled user device 301b. Assistant-1 312a further responds to a response trigger by receiving one or more messages from message queue-A 322b, which message queue is accessible for transferring messages by assistant-2 312b.

Conversely, FIG. 3d shows how assistant-2 312b responds to a synchronization trigger by storing one or more synchronization messages in message queue-A 322b, which message queue is accessible for receiving messages by assistant-1 312b. Assistant-2 312b further responds to a response trigger by receiving one or more messages from message queue-B 322b, which message queue is accessible for transferring messages by assistant-1 312a.

The queue configuration is also useful where more than one synchronizing group of ASync-enabled user devices is utilized, e.g., implementing a new queue for each separately operating or overlapping ASync-enabled user device. Deleting received synchronization messages is further facilitated and can, for example, be conducted by common store manager 321 (FIG. 3c) upon a synchronization message retrieval by each ASync-enabled user device. Other data structures or configurations of data structures can also be used in accordance with a particular application.

FIGS. 5 through 10 illustrate exemplary asynchronous synchronization assistants in greater detail. As shown in FIG. 5, assistant 500 includes asynchronous scheduler 501, synchronization controller 503, synchronization engine 505, synchronization history 507, synchronization adapters 509, preference engine 511, system monitor 513 and interface generator 515.

Asynchronous scheduler 501 responds to triggering events by invoking synchronization controller 503, and thereby causing a corresponding ASync-enabled user device to initiate synchronization or respond to a queued synchronization message. The triggering events are selectably enabled by a user via user preference engine 511 and selection options are presented to a user by interface generator 515. Triggering events can include but are not limited to one or more of local database change notifications (e.g. from an application program interface or "API", a positive result from polling an other device or "remote" message queue, receipt of a SMS alert, expiration of a scheduled synchronization timer or manual synchronization invocation by a user. (SMS or "short message service" is a system that allows transmission of short text messages to a cell phone or other wireless device. An SMS alert can be used to cause an application local to the device to be alerted by and react to the receipt of such messages, for example, for causing synchronization scheduler 501 to initiate synchronization activity.)

Asynchronous scheduler 501 responds to system monitor 513 by causing or preventing initiating of a synchronization operation or by changing the manner of response. For example, a synchronization trigger can be delayed or a user alert can be initiated while a user is accessing a device. A greater or lesser number of synchronization messages can also be transferred/received in accordance with a corresponding greater or lesser availability of network or device resources, among other examples.

(System monitor 513 operates in an otherwise conventional manner to determine and report ongoing user device or network activity levels. System monitor 513 also monitors particular activities, such as ongoing operation of a user device by a user.)

Synchronization controller 503 responds to synchronization scheduler 511 by identifying and initiating any workspace element modifications. More specifically, synchronization controller 503 fetches, from synchronization adapter 509, a workspace element change list, if such a list exists. The workspace element change list contains a reference to some or all of the workspace elements that have been recently modified. That is, workspace elements that have been added, modified, or deleted since the last synchronization message regarding that element was sent out to the other device(s) participating in the synchronization. The synchronization adapter may determine this change list in a way appropriate to the change indication capabilities of the local element store to which it interfaces. (See below.)

Synchronization controller 503 further invokes synchronization history 507 and synchronization adapters 509, and transfers to synchronization adapters 509 any change list information. Synchronization controller 503 then invokes synchronization engine 505.

Synchronization engine 505 provides for determining whether conflicting updates of the same workspace element exist, and if so, for resolving the conflict. Synchronization engine 405 also provides for initiating updating of local workspace elements (i.e., of the user device) and transfer of modified workspace elements of the user device.

Continuing with FIG. 6, synchronization engine 505 includes message parser 601, history manager 602, conflict engine 603 data transfer engine 604, version assignor 605 and data reference manager 606. Conflict engine 603 includes conflict detector 631 for detecting conflicts and conflict resolver 602 for resolving conflicts, and transfer engine 604 includes data transfer engine 641 message transfer engine 642.

In the depicted example, synchronization engine 505 determines the existence of a conflict by comparing version information of a received workspace element with that of the most recent version stored by the user device. More specifically, a version stamp is assigned for each synchronizing user device at least with respect to each workspace element by a respective version assignor 605. (Other granularities might also be used, for example, to track one or more attributes of each workspace element. However, limited resources of many devices, such as PDAs or cell phones, can be prohibitive.) Each user device then increments its version stamp for the workspace element in conjunction with each modification of the workspace element entered by the user device, which modification is also transferred via the data center to the other synchronizing devices.

Thus, for example, an unmodified (or new) workspace element X that is synchronized among two user devices might have a numerical version stamp of $_0X_0$. If only the first user device enters a modification, then the first user device increments its version before transferring the workspace element, yielding the version stamp of $_1X_0$. If only the second user device enters a modification, then the second user device increments its version before transferring the workspace element, yielding the version stamp of $_0X_1$.

The exemplary synchronization message of FIG. 7 shows how each synchronization message containing data includes the incremented version stamp for each user device, here user device-1 704 and user device 2 705. (The remaining message fields include a (unique) message ID 701, an instruction 702, the workspace element information or data 703, the source user device of the data 706, and the target user device of the data.) Thus, consider the following cases.

Example 1

Case 1:
If user device-2 receives the modification entered by user device-1 to element X and enters a modification to element X, then user device-1 will receive a message containing the twice modified element X having the version $_1X_1$.

Example 2

Case 2a:
If instead user device-2 enters a modification to element X prior to receiving the modification by user device-1, then user device-1 will instead receive the once modified element X (by user device-2) having the version $_0X_1$.

Example 3

Case 2b:
User device-2 will also later receive the message from device-1 containing the element X and the version $_0X_1$.

The exemplary synchronization history map of FIG. 8 shows how history manager 602 (FIG. 6) of the synchronization engine of each user device further maintains each current synchronization state for all synchronizing user devices (e.g., user device-1 version stamp 812 and the user device-2 version stamp 813) for each synchronized workspace element prior to receiving a new message.

(Other history map portions include hash values 814 for enabling record value comparison and change detection, and read-only flags 815 to enable change propagation to be inhibited where required. A history map can further include a synchronization state not specific to any record (not shown), such as the current message version stamp counter or the modified date to use as a cutoff when conducting a full change scan of a local database or other data space containing workspace data, among other map portions.)

Conflict detector 630 of synchronization engine 505 (FIG. 6) thus determines whether a conflict exists by comparing the new "received" version information received from message parser 601 (which parses a received synchronization message) with the current version information received from history manager 602, which polls the synchronization history map.

Returning now to the above examples, the initial current version stamp for each of user device-1 and user device-2 was $_0X_0$. In example 1, user device-1 updates X and then user device-2 receives, such that the current version stamps for user devices 1 and 2 become $_1X_{0(1)}$ and $_0X_{0(2)}$ and the received version for user device 2 becomes $_1X_{0(2)}$. Next, user device-2 updates X and then user device 1 receives. Thus, the version stamps for user devices 1 and 2 become:

Current→$_1X_{0(1)}$ and $_1X_{1(2)}$; Received→$_1X_{1(1)}$ and $_1X_{1(2)}$.

In example 2, user device-1 updates X, then user device-2 updates X without receiving, and then user device 1 receives. Thus, the version stamps for user devices 1 and 2 become Current→$_1X_{0(1)}$ and $_0X_{1(2)}$; Received→$_0X_{1(1)}$ and not applicable$_{(2)}$.

Finally, example 3 is the same as example 2 except that user device-2 now receives the user-device-1 update. Thus, the version stamps for user devices 1 and 2 become Current→$_1X_{0(1)}$ and $_0X_{1(2)}$; Received→$_1X_{1(1)}$ and $_1X_{1(2)}$.

Conflict detector 630 operates according to a general behavior that an event that "happened after" another event takes precedence over the event that "happened before". However, events that occurred concurrently represent conflicts and must be resolved by applying conflict resolution rules. In applying even this general rule, the result of the conflict detector 630 comparison would indicate no conflict in example 1, but would indicate a conflict in examples 2 and 3 due to the concurrent updates. The conflict detector of user device-1 would thus detect a conflict upon receipt of the user device-2 update in example 2, and the conflict detector of user device-2 would detect the conflict upon receipt of the user device-1 update in example 3.

More specific rules for detecting conflicts are, however, found to be applicable to different types of modifications. Such modifications, which are provided as instructions or "commands" within synchronization messages, include: commands to update to existing workspace elements or "Update" (or "replace") commands; commands to add new workspace elements or "Add" commands, and commands to delete workspace elements or "Delete" commands. (While other rules might also apply in a particular implementation, the following exemplary rules appear to work particularly well.)

When an assistant of an ASync-enabled user device receives an update command message and the conflict detector compares the current and new version stamps, there can be expected cases or unexpected cases (i.e., potential/actual errors). Among the expected Update command cases:

(1) If the current and received local versions (i.e., for the receiving user device) are equal and the received remote version (i.e., for the sending user device) is greater than the current remote version, then no conflict is detected and the update to the stored workspace element should be applied, and the received remote version stamp stored as current.

(2) If, however, the new local version is less than the current local version and the received remote version is greater than the current remote version, then a conflict or "conflicting update" exists.

Among the unexpected update cases:

(3) If the local versions are equal and the remote versions are equal, then an update conflict exists, and the following should be applied: If the received update data matches the local data, a duplicate message may have been sent. In this case, the command may be applied or ignored, as these are equivalent. If, however the update would alter the local data, then an error has taken place remotely. The update conflict resolution should be applied and remote crash-recovery should be invoked.

(4) If the received remote version is less than the current remote version and the received local version is less than or equal to the current local version, then an error has occurred. The update should not be applied. Either the message has been received out of order or an error has occurred at the remote device. If the message transport system used guarantees message ordering and delivery, then it may be assumed that the remote device is in error and remote crash-recovery should be invoked.

(5) If the received local version is greater than the current local version and the received remote version is greater than or equal to the current remote version, then an error has occurred locally. The update should be accepted and local crash-recovery should be invoked.

(6) If the received local version is less than the current local version and the new and current remote versions are equal, then an error has occurred and crash-recovery. The update should not be applied. Either a duplicate message has been received or an error has occurred at the remote device. If the message transport system used guarantees no duplicate delivery of messages, then it may be assumed that the remote device is in error and remote crash-recovery should be invoked.

(7) If the received local version is greater than the current local version and the received remote version is less than the current remote version, then an error has occurred and an update conflict exists. The update conflict resolution should be applied and local crash-recovery should be invoked.

Note that the synchronization history is expected to keep "tombstones" for entries that are deleted. These are entries that simply record the element identifier and the local and remote version stamps associated with the record at the time of deletion (with the local version incremented account to the act of deletion itself). This allows conflict detection and resolution to be done even for locally deleted elements. If an Update arrives which applies to a deleted element, whose "tombstone" has been purged from the synchronization history, then the Update will be treated as an Add. The synchronization history should maintain the tombstones long enough for most such Update commands to work their way through the system first.

Conflict detector 631 (FIG. 6) upon detecting an update conflict, invokes conflict resolver 632. Conflict resolver 632 then applies conflict resolution rules to resolve the conflict, and further, invokes data transfer engine 641 or message transfer engine 642 to initiate respective transfers as needed. Examples of conflict resolution rules for update commands can include the following accept, reject and duplicate rules.

1) The receiving user device can accept the update. In this case, a resolution includes updating/replacing the existing workspace element and storing the maximum of the received remote and current remote version stamps as the current remote version, and storing the maximum of the received and current local version stamps as the current local version.

2) The receiving device can reject the update. In this case, a resolution includes not updating the existing workspace element, but storing the maximum of the received remote version stamp and current remote version stamps as the current remote version and storing the maximum of the received and current local version stamps as the current local version.

3) The receiving device can duplicate the local workspace element. In this case, a resolution includes accepting the change to the original workspace element by all but one "server" user device, and the server user device rejecting the change to the original and applying the change to the duplicate. The new workspace element (with the changes) will cause an Add command to be issued by the synchronizing user devices, which command can be resolved according to conflicting Add command conflict resolution. (This option should not be used in cases where the element update would not result in any change to the local element.)

It should, however, be noted that conflict resolution should generally be conducted in a global manner among synchronizing devices. Thus, conflict resolution rules should be predetermined for each user device and remain static, or rules or indicators of rules stored by user devices should be communicated among the user devices as they change. Another alternative is to configure at least one synchronizing user device to operate as a control or "server" user device. In this case, the remaining or "client" user devices, upon detecting a version conflict, can duplicate the existing workspace element. Upon receipt of the resulting Add command, the server user device can resolve the conflicts and issue delete commands as needed.

Figures 9, 10:
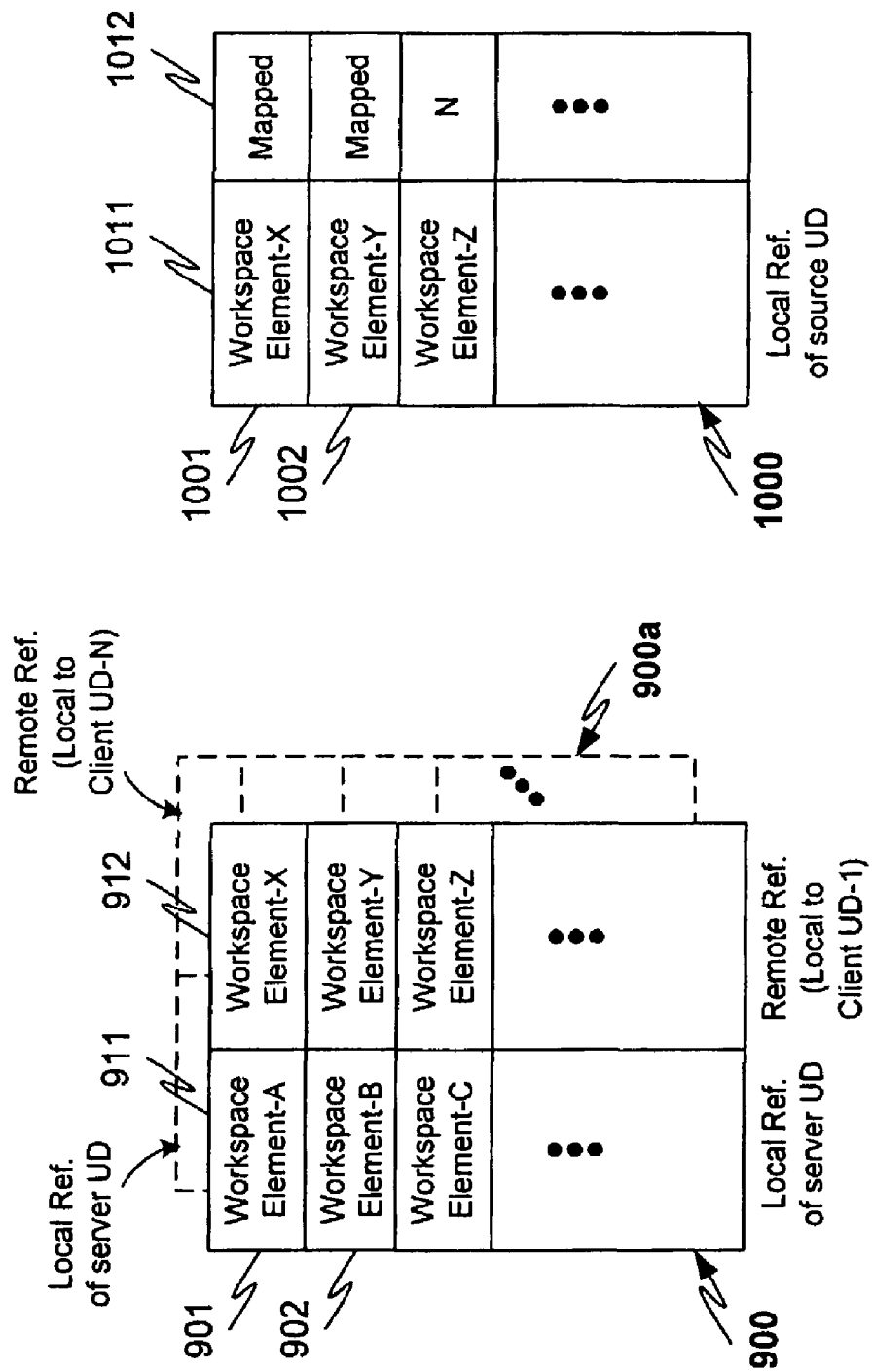
FIG. 9 illustrates a server user device map according to an embodiment of the invention.
FIG. 10 illustrates a client user device map according to an embodiment of the invention.

Turning first to FIG. 6, and then with further reference to FIGS. 7, 9 and 10, Add commands are unique. Unlike existing workspace elements, there is no preexisting common reference to newly created workspace elements, unless each user device maintains an identical data space. However, a remote referencing mechanism is found that enables integration of new workspace elements with even vastly different user device configurations and applications programs or other sources of data.

On receipt of a synchronization message including an Add command, data reference engine 606 of synchronization engine 505 parses the message for a local reference of the workspace data of the sending user device. Data reference engine 606 stores the sending device workspace element reference in a data reference map, such as with element 901-912 of the exemplary data reference map 900 of FIG. 9.

Data reference engine 606 further adds to the map a local reference for the receiving user device (e.g., reference 901-911), and the workspace data is stored according to the sending device reference. Data reference engine 606 repeats this process for every added workspace element, such that a map of all workspace elements of all user devices is maintained.

Thereafter, upon receipt of a synchronization message with the same sender reference, data reference engine 606 polls the data reference map for the corresponding local (hosting user device) reference and synchronization continues according to the local reference. Conversely, when synchronizing a local modification of the workspace data, reference engine 606 polls the data reference map for the local reference, retrieves the recipient reference and a synchronization message is formed according to the recipient reference.

Note that the source and local references do not need to correspond to a memory address. The local references need only be sufficient for establishing the correspondence and conducting local processing.

Further, this mechanism enables one user device, rather than all user devices, to maintain the data reference map. This one "server" user device can, for example, have superior available resources than the other devices. The second (or other) user devices can maintain merely a "reference sent" map indicating which references have been sent, such as in the exemplary completion map of FIG. 10. Then, upon synchronization, the data reference manager of second user device can poll the reference sent map to determine whether a reference was sent. If not, then the reference manager can add the reference to the synchronization message and set the mapped flag to indicate that the reference has been sent.

Conflict detection and resolution examples for an Add command are as follows. In general, synchronization should identify identical workspace elements being added to both sender and recipient user devices, and workspace element duplication should be avoided. More specifically, on receipt of an Add command:

1) An included local version stamp greater than zero indicates a forced Add. A resolution can include adding a new workspace element, marking the workspace element as mapped and issuing a responsive Map command.
2) Where a workspace element is included with an Add command, a response can include comparing the included workspace element to all local records not marked as mapped.
3) If no match is found, then the Add is not in conflict. A response can include creating a new workspace element, marking the element as mapped and issuing a responsive Map command.
4) If a match is found, then this is a conflicting Add. A resolution can include setting the remote component of the record version stamp to the value contained in the update command, marking the workspace element as mapped and issuing a responsive Map command.

Note that newly created workspace elements are not marked as mapped and should be marked as mapped when a Map command is received.

Conflict detection and a Delete command is the same as that for an Update command, except that acceptance of a Deletion involves deleting the local copy of an element and marking the synchronization history entry for that element to indicate that the entry is merely an tombstone for a deleted record. The Deletion conflict resolution options are the same as those for an Update command, except the duplication option, which does not apply.

Resulting conflict engine 607 further provides for resolving conflicts that ultimately result in such applications as calendaring or project management, among others. For example, a meeting might be scheduled to occur at two different locations, or sequential meetings might be too disparately located to attend both. Resulting conflict engine 607 polls workspace data and workspace data from message parser 601 for resulting conflicts and resolves the conflicts in accordance with resulting conflict resolution rules or user interaction.

Returning again to FIG. 5, synchronization adaptors 509 implement a generic interface that allows the Sync Engine to access a specific database, application or other data space. This interface allows the Sync Engine to fetch particular records and to iterate through the set of records that have "recently" changed. The interpretation of recent will depend on the type of adapter and the particular constructor used to instantiate it.

For example, different operating systems, application programs or other systems may or may not provide indicators of data modifications. Examples of various system provisions are as follows:

1. A flag for each workspace element is set each time the element is modified.
2. A "last modified" date is recorded for each element;
3. Some other indication, such as some current sequence number associated with the element store is stored with each element when it is changed;
4. The element store signals change events via a publish/subscribe type interface when an element is changed; and
5. No element change indicator is stored.

To facilitate determination of recent changes in cases 2 and 3, the synchronization controller can for example, at the start of synchronization activity, supply each synchronization adapter with a synchronization anchor. The synchronization anchor can be a simple token (e.g., a timestamp or a sequence number) fetched from the synchronization history. The token indicates a cutoff, corresponding to the moment that the previous instance of synchronization activity occurred. The synchronization adapter may use the token to infer that elements that have changed prior to the indicated cutoff date or sequence number should not be returned in the change list. The synchronization adapter can further return a "new anchor" token, which may be used in a subsequent synchronization activity to indicate a cutoff corresponding to the then present moment. If the synchronization engine successfully processes all elements in the change list, then the synchronization history can be updated with the new anchor token.

To facilitate determination of recent changes in cases 1 and 4, the synchronization engine can explicitly acknowledge to the synchronization adapter the successful processing of each change list element as it is processed. This enables the synchronization adapter to clear the associated change flag (case 1) or to delete the associate change event notification from an internal queue (case 4).

In case 5, the synchronization adapter returns a list of all current elements in the change list. The synchronization engine then processes all elements with every synchronization and uses the short hash of each element from the last synchronization (which is stored in the synchronization history) to determine when an element has actually changed. In this case, it can also compare the elements to those in the synchronization history to infer which elements have been deleted.

In a case where the Sync Adapter can determine modifications, but not deletions based on a cutoff date, the synchronization engine can separately request from the synchronization adapter a list of all elements. The synchronization engine can then infer modifications from the change list and infer deletions from the synchronization history and the list of all current elements.

Local adapters enable access to a local database or other data space, and generally to any record contained therein. The set of "recent" changes may be determined, for example, by a set of change events supplied in the constructor, by a "last-modified" cutoff date (extracted from the SyncHistory), or by querying a database for dirty bits.

Local adapters also facilitate synchronization of workspace elements between applications. For example, synchronization of data between PIM applications with differing capabilities requires field mapping, field truncation, recurrence rule mapping, and (sometimes) value range projection. This can be accomplished by a Local Data Adapter mapping fields from the native representation to a common field representation before returning field data to the synchronization engine. Truncation, recurrence mapping, and range projection for a particular device are further applied to field data by a remote data adapter before Update messages are queued.

Remote adapters enable access to a remote database via update messages routed through the remote message queue. Remote adapters generally enable only read access to records that have had update messages queued, and write access to records that should have update messages queued.

Remote adapters also enable a high degree of flexibility with regard to the device configurations and data sources that can be used. The adapters can make decisions regarding field mapping, field truncation, and recurrence rule support, and other modifications on behalf of the remote device. The adapters can also conduct conversion or translation as needed. It is therefore not necessary that each synchronizing user device be the same device, run the same programs or maintain equivalent memory spaces.

Synchronization adapters must be able to access the data corresponding to workspace elements. This data can be translated into a common format that can be interpreted by the remote adapters which will handle marshalling of the data for transmission to another device. The synchronization adapter exposes element access and modification methods, which will allow the synchronization engine to conduct the synchronization. These methods include can, for example, include setLastSyncAnchor, getNextSyncAnchor, getAllElementReferences, getChangedElementReferences, getHashRepresentationOfElement, addElement, copyElement, modifyElement, deleteElement, applyTruncationToElement, and acknowledgeChange.

Of the remaining assistant elements, security engine 515 provides for implementing such security measures as authentication and encryption. Encryption and decryption can be conducted on a workspace element in conjunction with message paser 601 (FIG. 6). Given the variable data granularity afforded by asynchronous synchronization, encryption can be conducted in an otherwise conventional manner prior to transferring the workspace element to the data center even within a low-resource user device. Decryption is similarly conducted upon receipt of workspace element or, if stored in encrypted form, upon retrieval of the workspace element.

Crash recovery engine or "crash manager" 516 may be alerted of a synchronization errors noticed by the synchronization engine during processing. The synchronization engine utilizes the local and remote version stamps to detect cases where the local or the remote device may have experienced data loss or corruption, possibly followed by a restore from backup. The synchronization engine detects a crash as a condition in which a message is received that has a local version stamp greater than the current local version for the associated element. This is described in further detail above. In the event of a crash and restore from backup, the local current version stamps stored in the synchronization history for various elements will inevitably be set back to some prior values.

Remote crash/restore events may similarly be detected by receipt of messages where the remote version is less than or equal to the current remote version for the associated element and the message transport system is used where message delivery, message non-duplication and strict message ordering is guaranteed. This is described in further detail above.

When such failures are detected, a re-synchronization should be conducted. In the case of a local crash detection, the "crash manager" must decide whether to conduct a recovery. It may prompt a user for confirmation or use some other mechanism whether the recovery should be initiated. This might even include sending a message to another device (B), indicating that a crash has occurred at this device (A). The "crash manager" at device B might be better positioned to prompt for user feedback as to whether a recovery should be initiated. In the case of a remote crash, the "crash manager" should send a message to the other device alerting it to the possibility that its own data may be corrupted.

Once a decision has been made to initiate a recovery, the "crash manager" should alert the synchronization scheduler to execute a "recovery sync". In such a sync, the synchronization engine is directed to send to the other device Update messages for all mapped elements, Add messages for all unmapped elements, and Delete messages for all element tombstones in the synchronization history. Each of these messages must be marked as "recovery" messages, so that receipt of such messages will not trigger crash detection on the other device. In addition, a "recovery sync" request must be sent to the other device, which likewise will send recovery messages for all elements currently in the associated data element store or referenced by tombstones in the synchronization history. Processing of each of these recovery Add, Update, and Delete messages can be done as described above, except that the crash detection logic is not triggered by these messages, many of which may have backdated local or remote version stamps.

FIGS. 11 through 14 illustrate exemplary methods according to which synchronization can be initiated, routed, and received and processed.

As shown in FIG. 11, a first computing device, having received a triggering event in step 1101, responds by determining whether any modifications have been made to first device data in step 1103. If so (step 1105), then the first device determines one or more recipient devices and may conduct security procedures for the first device user and/or device in step 1107.

Exemplary security procedures are given in FIG. 12, wherein the first device retrieves recipient device identification and, if encrypted, decrypts the identification in step 1201; the first device also determines whether permissions exist for the current first device user and device to synchronize the modification. Unless the modification is disallowed in step 1205, the method continues at step 1109 of FIG. 11.

Permissions to, for example, synchronize additions, changes/updates or deletions with the recipient device can be conducted in an otherwise conventional manner. (Security might more typically apply where a third party device user, such as a secretary, spouse or child, attempts to synchronize modifications and access to a recipient device user's local device is unavailable.) It should be noted that security information or failed attempts to synchronize modifications can be propagated to or synchronized with a recipient device in a similar manner as with synchronization of information as discussed herein. Thus, for example, the operation of a lost device capable of modifying remote device information via synchronization can be avoided or reported.

In step 1109 of FIG. 11, the first device configures modification indicators corresponding to the modifications. An example of such configuration is given in FIG. 12b. Beginning with step 1211, the first device determines a number of modifications to transfer, for example, in accordance with user accessing of the device, device resources or other factors (e.g., see above).

The first device further determines recipient device characteristics in step 1211, converts the modifications to a global format in step 1213 and converts the modifications to a format suitable for the recipient device(s). Such modifications might, for example, include data or data format manipulation, such as that discussed herein with regard to synchronization data adapters, among other examples.

In step 1217, the first device optionally encrypts the modification indicator(s), if the modification indicator(s) is/are to be transferred in encrypted form. (While asynchronous synchronization enables lesser resource utilization than synchronous systems, the use of resources here can also be factored into determining a suitable number of modifications. Determination of resource requirements according to the data or data attributes or other factors and sensing of user utilization can, for example, be determined in an otherwise conventional manner.)

In steps 1219, the first device determines other information needed to communicate the modification. As discussed above, for example, the additional information can include a command type, command ID, any reference mapping information, and so on, such as that utilized in the above synchronization message examples.

Finally, in step 1111 (FIG. 11), the first device transfers the modification indicator (or synchronization message) to a routing system, such that the modification is capable of being received by the second device and synchronized with second device data in response to a second device trigger triggering asynchronously with regard to the first device trigger.

Figure 13:
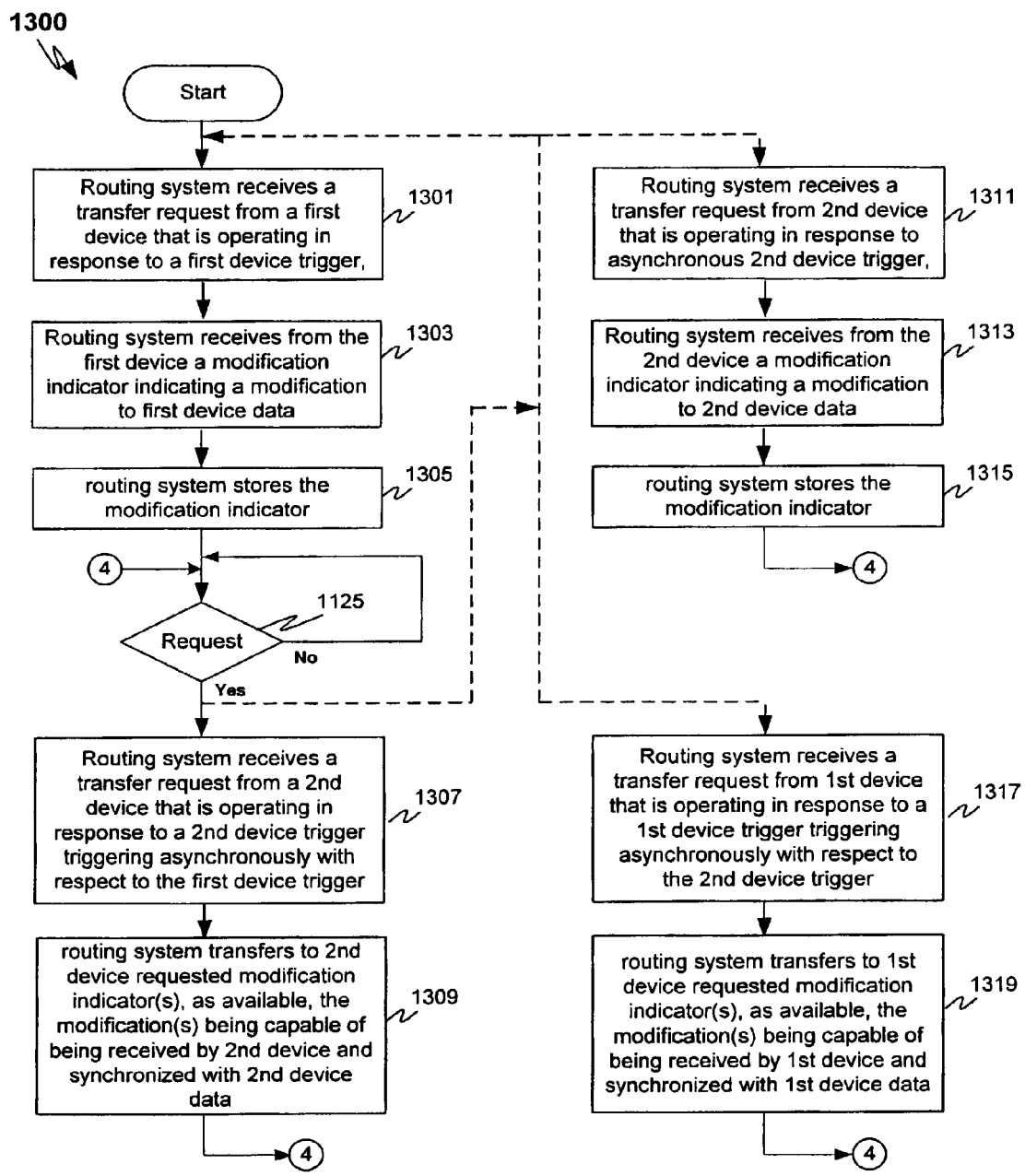
FIG. 13 is a flowchart illustrating a method for a routing system handling one or more modifications transferred among asynchronously synchronizing computing systems, according to an embodiment.

FIG. 13 further illustrates a routing system method example. As shown, the routing system receives a transfer request from a first device operating in response to a first device trigger in step 1301 (e.g., the trigger of the first device of FIG. 11). The routing system further receives from the first device a modification indicator indicating a modification to first device data in step 1303, and stores the modification indicator for asynchronous receipt by a second device in step 1305. The routing system (with regard to synchronization) waits for a further request in step 1306.

Synchronization of the modification indicator of steps 1303 through 1305 (and possibly other modification indicators) can then continue with steps 1307 and 1309. However, asynchronous operation also enables further receipt of one or more further modification indicators from the first device in steps 1301 through 1305, receipt of further modification indicators from a second device in steps 1311 through 1315, or transfer of modification indicators to the first device in steps 1317 through 1319.

Beginning with step 1303, the routing system receives a transfer request from a second device that is operating in response to a second device trigger triggering asynchronously with respect to the first device trigger. Then, in step 1309, the routing system transfers to the second device one or more requested modification indicators stored by the routing system, the modification(s) being capable of being received by the second device and synchronized with second device data.

Beginning instead with step 1311, the routing system receives a transfer request from a second device that is operating in response to an asynchronous second device trigger. As in the above examples, the trigger is asynchronously initiating with regard to a first device trigger and can be the same trigger or, more typically, a different trigger than that of steps 1307-1309 (e.g., a modification to data, synchronization initiation schedule or user modification as opposed to a user access to information or a synchronization receipt schedule.). In step 1313, the routing system receives from the second device a (second device) modification indicator indicating a modification to second device data, and the routing system stores the modification indicator in step 1315.

Beginning instead with step 1317, the routing system receives a transfer request from the first device that is operating in response to a first device trigger triggering asynchronously with respect to the second device trigger. (Various trigger options again exist, e.g., as given above.) The routing system further transfers to the first device one or more requested modification indicators, as available, the modification(s) being capable of being received by the first device and synchronized with first device data.

Figure 14:
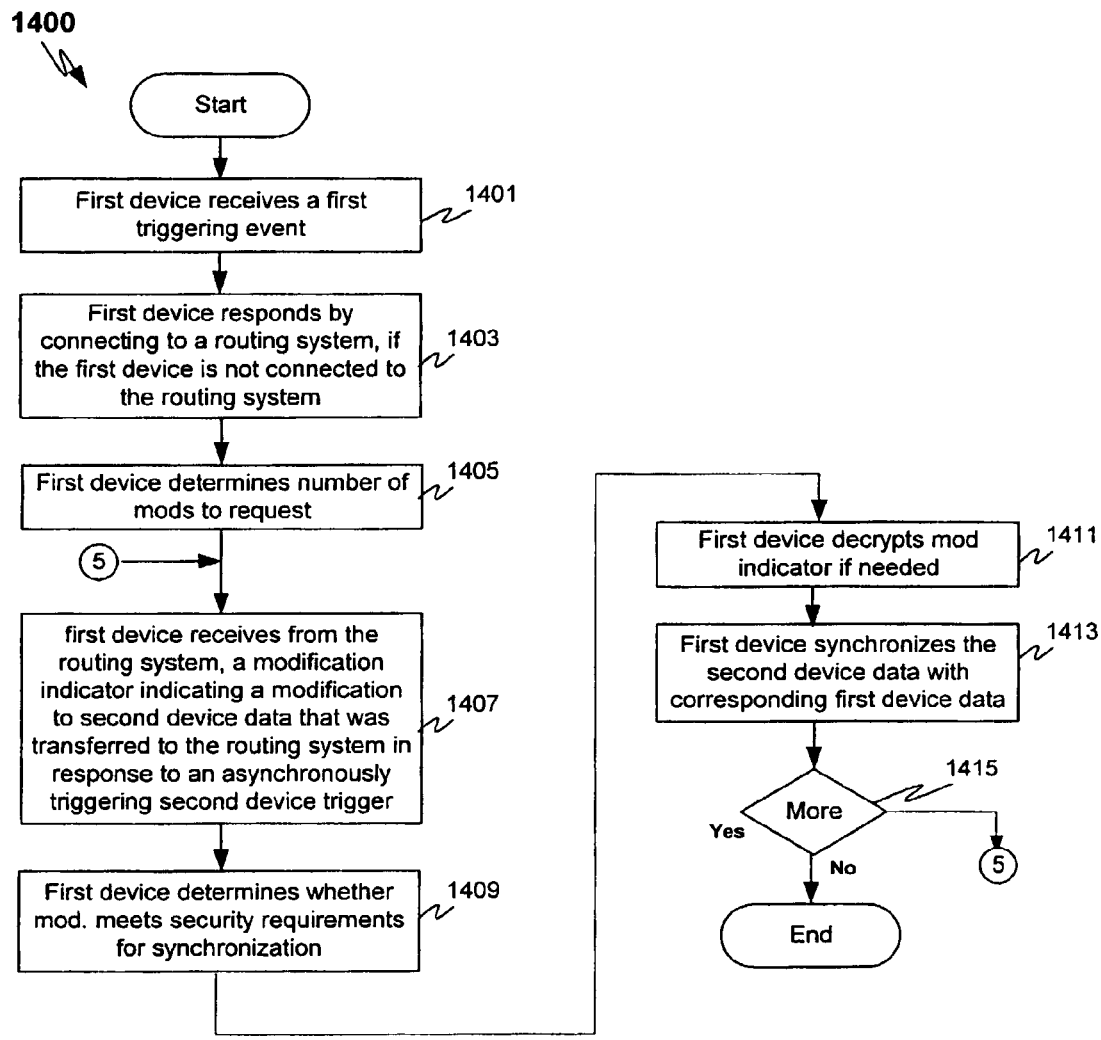
FIG. 14 is a flowchart illustrating a method for conducting asynchronous synchronization by a first device of one or more second device modifications according to an embodiment of the invention.

FIG. 14 illustrates an exemplary method for handling initiated synchronization. As shown, a first device receives a first triggering event in step 1401, and responds by connecting to a routing system (if not already so connected) in step 1403. In step 1405, the first device determines a number of modification indicators to request, e.g., in accordance with first device, other system, user or device utilization factors. In step 1407, the first device receives from the routing system a modification indicator indicating a modification to second device data that was transferred to the routing system in response to an asynchronously triggering second device trigger (at least with respect to the first device trigger).

In step 1409, the first device optionally determines whether the modification meets security requirements for synchronization. (Note that security can be conducted by a sending device, a receiving device, or both, e.g., in a shared manner. See, for example, FIGS. 11 and 12.) In step 1411, the first device decrypts the modification indicator, if the indicator is encrypted, and in step 1413, the first device synchronizes the second device modification with corresponding first device data, e.g., by adding, updating or deleting first device data. Finally, the first device returns to step 1407 if more indicators remain to be processed. It will be appreciated that all or a portion of modification indicators stored by a routing system may be retrieved from a routing system at once, in one synchronization "session" or in successive synchronization sessions.

While the present invention has been described herein with reference to particular embodiments thereof, a degree of latitude of modification, various changes and substitutions are intended in the foregoing disclosure, and it will be appreciated that in some instances some features of the invention will be employed without corresponding use of other features without departing from the spirit and scope of the invention as set forth.

What is claimed is:

1. A method, comprising:
   receiving, by a first computing device, a first triggering event;
   responding to the first triggering event, by the first computing device, by connecting to temporary storage in a routing system, when the first computing device is disconnected from the routing system;
   receiving, by the first computing device from the temporary storage, a synchronization message relating to a workspace element, said synchronization message having been transferred to the temporary storage in response to an asynchronously triggering second device trigger of a second computing device, said synchronization message including a set of one or more version identifiers and data indicative of a modification to the workspace element;

comparing, by the first computing device, said set of one or more version identifiers with a further set of one or more version identifiers relating to said workspace element, said further set of version identifiers being stored at said first computing device;

on the basis of the comparison, performing a first synchronization process or a second synchronization process, the first synchronization process including:
synchronizing, at the first computing device, a locally stored copy of said workspace element based on said modification data contained in said synchronization message, the second synchronization process including:
transmitting to the second computing device a recovery request message,
receiving from the second computing device a set of one or more recovery messages relating to synchronization of a copy of said workspace element stored locally at the second computing device, and
processing said set of one or more recovery messages at the first computing device to re-synchronize the copy of said workspace element stored locally at the first computing device.

2. The method according to claim 1, wherein each of said one or more recovery messages includes a set of one or more version identifiers relating to said workspace element, and processing said set of one or more recovery messages to re-synchronize the locally stored copy of said workspace element includes processing said set of one or more recovery messages on the basis of the respective set of one or more version identifiers included in each recovery message.

3. The method according to claim 1, wherein said second synchronization process further comprises:
transmitting to the second computing device a further set of one or more recovery messages relating to synchronization of the workspace element at the first computing device, said second computing device processing said further set of one or more recovery messages to re-synchronize the copy of the workspace element stored locally at the second computing device.

4. The method according to claim 1, wherein said set of one or more recovery messages includes one or more of add, update and delete messages relating to a previous synchronization of the workspace element at said second computing device.

5. The method according to claim 1, wherein each of said sets of one or more version identifiers includes a version indicator corresponding to the copy of said workspace element stored at said first computing device, and the comparison between the sets of one or more version identifiers includes comparing the respective version indicators corresponding to the copy of said workspace element stored at said first computing device.

6. The method according to claim 5, further comprising:
performing said second synchronization process when the comparison of the respective version indicators corresponding to the copy of said workspace element stored at the first computing device indicates that said version indicator in the set of one or more version identifiers received in the synchronization message relates to a more recent version of the workspace element than said version indicator in said further set of one or more version identifiers stored locally at the first computing device.

7. The method according to claim 1, wherein each of said sets of one or more version identifiers includes a version indicator for said copy of the workspace element stored locally at the second computing device, and the comparison between the sets of one or more version identifiers includes comparing the respective version indicators corresponding to the copy of said workspace element stored at said second computing device.

8. The method according to claim 7, further comprising:
performing said second synchronization process when the comparison of the respective version indicators corresponding to the copy of said workspace element stored at the second computing device indicates that said version indicator in the set of one or more version identifiers received in the synchronization message relates to one of a same version or a less recent version of the workspace element than said version indicator in the further set of one or more version identifiers stored locally at the first computing device.

9. The method according to claim 1, further comprising:
performing a third synchronization process in response to a determination of a conflict between said sets of one or more version identifiers, the third synchronization process including one of:
using the modification data to update the copy of the workspace element stored locally at the first device based on a most recent version of the workspace element indicated by the sets of one or more version identifiers,
using the set of version identifiers to update the further set of one or more version identifiers stored by the first computing device based on the most recent version of the workspace element indicated by the sets of one or more version identifiers, and
duplicating, at the first computing device, the copy of the workspace element stored locally at the first computing device, and updating, using the modification data, one of the copy of the workspace element and the duplicate of the workspace element stored locally at the first computing device.

10. The method according to claim 1, further comprising:
performing said first synchronization process in response to a determination that there is no conflict between the sets of one or more version identifiers.

11. A computer-readable storage medium storing computer-readable instructions thereon, the computer-readable instructions when executed by a computer cause the computer to perform a method comprising:
receiving, by a first computing device, a first triggering event;
responding to the first triggering event, by the first computing device, by connecting to temporary storage in a routing system, when the first computing device is disconnected from the routing system;
receiving, by the first computing device from the temporary storage, a synchronization message relating to a workspace element, said synchronization message having been transferred to the temporary storage in response to an asynchronously triggering second device trigger of a second computing device, said synchronization message including a set of one or more version identifiers and data indicative of a modification to the workspace element;

comparing, by the first computing device, said set of one or more version identifiers with a further set of one or more version identifiers relating to said workspace element, said further set of version identifiers being stored at said first computing device;

on the basis of the comparison, performing a first synchronization process or a second synchronization process, the first synchronization process including:
   synchronizing, at the first computing device, a locally stored copy of said workspace element based on said modification data contained in said synchronization message, the second synchronization process including:
   transmitting to the second computing device a recovery request message,
   receiving from the second computing device a set of one or more recovery messages relating to synchronization of a copy of said workspace element stored locally at the second computing device, and
   processing said set of one or more recovery messages at the first computing device to re-synchronize the copy of said workspace element stored locally at the first computing device.

12. A system, comprising:

means for receiving, by a first computing device, a first triggering event;

means for responding to the first triggering event, by the first computing device, by connecting to temporary storage in a routing system, when the first computing device is disconnected from the routing system;

means for receiving, by the first computing device from the temporary storage, a synchronization message relating to a workspace element, said synchronization message having been transferred to the temporary storage in response to an asynchronously triggering second device trigger of a second computing device, said synchronization message including a set of one or more version identifiers and data indicative of a modification to the workspace element;

means for comparing, by the first computing device, said set of one or more version identifiers with a further set of one or more version identifiers relating to said workspace element, said further set of version identifiers being stored at said first computing device;

means for performing a first synchronization process or a second synchronization process on the basis of the comparison, the first synchronization process including:
   synchronizing, at the first computing device, a locally stored copy of said workspace element based on said modification data contained in said synchronization message, the second synchronization process including:
   transmitting to the second computing device a recovery request message,
   receiving from the second computing device a set of one or more recovery messages relating to synchronization of a copy of said workspace element stored locally at the second computing device, and
   processing said set of one or more recovery messages at the first computing device to re-synchronize the copy of said workspace element stored locally at the first computing device.

\* \* \* \* \*